United States Patent
Radu et al.

(10) Patent No.: US 7,147,259 B2
(45) Date of Patent: Dec. 12, 2006

(54) CONSOLE AND OBJECT HOLDER ASSEMBLY FOR A VEHICLE

(75) Inventors: Bogdan Radu, Dearborn, MI (US); Alan G. Dry, Grosse Point Woods, MI (US)

(73) Assignee: Lear Corporation, Southfield, MI (US)

( * ) Notice: Subject to any disclaimer, the term of this patent is extended or adjusted under 35 U.S.C. 154(b) by 109 days.

(21) Appl. No.: 10/956,475

(22) Filed: Oct. 1, 2004
(Under 37 CFR 1.47)

(65) Prior Publication Data

US 2006/0071497 A1    Apr. 6, 2006

(51) Int. Cl.
*B60N 3/10* (2006.01)

(52) U.S. Cl. ............... 296/24.34; 296/37.8; 296/37.14; 296/1.09; 224/275; 224/537

(58) Field of Classification Search ............. 296/24.34, 296/37.8, 37.14, 1.09; 297/115, 116, 188.14, 297/188.15, 188.16; 224/537, 275
See application file for complete search history.

(56) References Cited

U.S. PATENT DOCUMENTS

| | | | |
|---|---|---|---|
| 4,052,103 A | | 10/1977 | Steinthal |
| 4,423,812 A | * | 1/1984 | Sato .................. 206/387.1 |
| 4,674,790 A | | 6/1987 | Johnson |
| 4,878,438 A | | 11/1989 | Carver |
| 4,928,865 A | * | 5/1990 | Lorence et al. ............. 224/275 |
| 4,984,847 A | | 1/1991 | Bedu et al. |
| 5,024,411 A | | 6/1991 | Elwell |
| 5,072,989 A | * | 12/1991 | Spykerman et al. ... 297/188.16 |
| 5,248,183 A | | 9/1993 | Gignac et al. |
| 5,316,368 A | | 5/1994 | Arbisi |
| 5,749,629 A | | 5/1998 | Heath et al. |
| 5,788,324 A | | 8/1998 | Shea et al. |
| 5,845,965 A | | 12/1998 | Heath et al. |
| 5,947,554 A | | 9/1999 | Mashkevich |
| 6,129,400 A | * | 10/2000 | Jakubiec et al. .......... 296/37.14 |
| 6,203,088 B1 | | 3/2001 | Fernandez et al. |
| 6,283,551 B1 | | 9/2001 | Bergin |
| 6,419,314 B1 | * | 7/2002 | Scheerhorn ............ 297/188.19 |
| 6,616,205 B1 | * | 9/2003 | Bruhnke et al. ........... 296/37.8 |
| 6,644,526 B1 | * | 11/2003 | Pegorier ...................... 224/539 |
| 6,663,155 B1 | * | 12/2003 | Malone et al. ............. 296/37.8 |
| 6,719,367 B1 | | 4/2004 | Mic et al. |
| 6,739,669 B1 | | 5/2004 | Etzioni et al. |
| 2003/0184133 A1 | | 10/2003 | Mic et al. |
| 2003/0218373 A1 | | 11/2003 | Etzioni et al. |
| 2004/0094587 A1 | | 5/2004 | Harden et al. |

FOREIGN PATENT DOCUMENTS

DE    84 18 140 U1    9/1984
WO    83/03392    10/1983

* cited by examiner

*Primary Examiner*—D. Glenn Dayoan
*Assistant Examiner*—Greg Blankenship
(74) *Attorney, Agent, or Firm*—MacMillan, Sobanski & Todd, LLC

(57) ABSTRACT

A console for a vehicle is disclosed. The console includes a body defining an opening and also includes a lid that is configured to cover the opening and a panel that is movably mounted relative to the body. The panel is movable between a retracted position within the opening and an extended position away from the opening. The panel also has at least one receptacle formed therein. The receptacle is configured to receive an object therein.

21 Claims, 4 Drawing Sheets

US 7,147,259 B2

CONSOLE AND OBJECT HOLDER ASSEMBLY FOR A VEHICLE

BACKGROUND OF THE INVENTION

This invention relates in general to storage compartments, and more particularly to storage compartments for holding objects in vehicle passenger compartments.

Vehicle cup holder assemblies are popular in modern vehicle designs. Countless variations of cup holder assemblies exist, each variation having varying degrees of efficiency, practicality, manufacturability and cost. Vehicle interior designers have continuously modified cup holder designs to improve aesthetics of the design and to improve functionality as cost constraints continue to tighten. The ideal design would be inexpensive to manufacture, simple to assemble, be aesthetically pleasing, and provide improved functionality such that it could securely hold a variety of shapes and sizes of cups. Accordingly, it is desirable to provide an improved vehicle cup holder assembly that achieves these stated goals while reducing the cost of manufacturing and assembly. In addition, concealing cup holder assemblies while they are not in use has also become a significant design consideration. However, while hidden or while in use, the cup holder assemblies should not interfere with other functions and features of the vehicle.

Similarly, in recent years, the use of mobile phones and other portable electronic devices by occupants of motor vehicles has increased substantially. The term "mobile phone" as used herein is intended to include wireless telephones, such as analog or digital cellular phones, PCS (personal communication systems), or other portable transmitter/receiver devices used for personal communication. Also, the rise in the use of personal digital assistant devices (PDA), notebook computers, Global Positioning Satellite receivers, portable electronic video games, and other "Bluetooth" compatible hardware has increased substantially. Thus, these devices are widely used in vehicles. However, most vehicles do not provide storage locations for securely holding these devices in place. Usually, these devices are simply laid across a seat, on the floor, or placed in a cup holder. Therefore, it is desirable to provide a structure for storing objects such as beverage containers, portable phones, or other electronic devices in a vehicle wherein the object holder assembly does not interfere with the normal operation and use of storage compartments and other vehicle consoles.

SUMMARY OF THE INVENTION

This invention relates to a console for a vehicle that includes a body defining an opening. The console also includes a lid that is configured to cover the opening and a panel that is movably mounted relative to the body. The panel is movable between a retracted position within the opening and an extended position away from the opening. The panel also has a receptacle formed therein. The receptacle is configured to receive an object therein.

The invention also relates to a vehicle console member that includes a body that defines an opening therein, a tray that is pivotably mounted relative to the body by a first hinge mechanism. The tray also defines a frame for receiving a panel therein. The panel has at least one receptacle formed therethrough for receiving an object. The panel is also pivotably mounted relative to the body and the tray by the first hinge mechanism to move the panel between a retracted position and an extended position. The vehicle console member also includes a lid that is pivotably mounted relative to the tray by a second hinge mechanism. The lid is configured to at least partially cover the opening. The first hinge mechanism is positioned along an axis that is substantially perpendicular to an axis of the second hinge mechanism.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
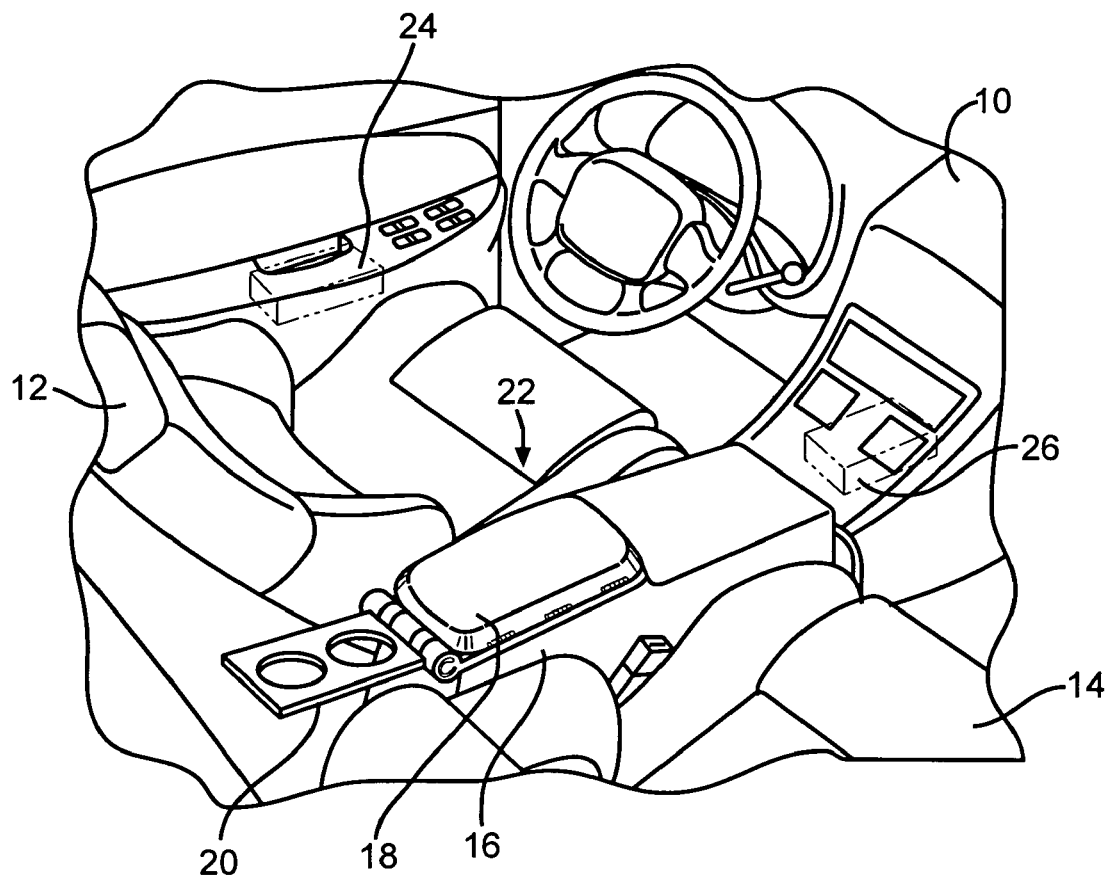
FIG. 1 is a view of the interior of a passenger compartment of a vehicle having a vehicle console according to the present invention.

Referring now to the drawings, there is illustrated in FIG. 1 an interior passenger compartment of a vehicle having various trim bodies and panels. Indicated generally at 10 is an instrument panel or dashboard. Positioned within the instrument panel 10 are visual gauges for the driver's convenience, and temperature and climate controls. Other controls, storage compartments and stereo controls can be positioned on a lower console. Also located within the passenger compartment is a glove box, a driver seat 12, and passenger seat 14. Positioned between the passenger seat 14 and the driver seat 12 is a vehicle console 16 or floor console that has a cover or lid 18 that can also serve as an armrest. The vehicle console 16 can be accessed by lifting the armrest lid 18 in a first open position or a second open position as will be described in greater detail below. The vehicle console 16 includes an object holder assembly 22 including an extendable panel 20. Shown in the extended position is a panel 20 that is configured to be used as a object (cup) holder assembly 22 according to the present invention.

Figure 5:
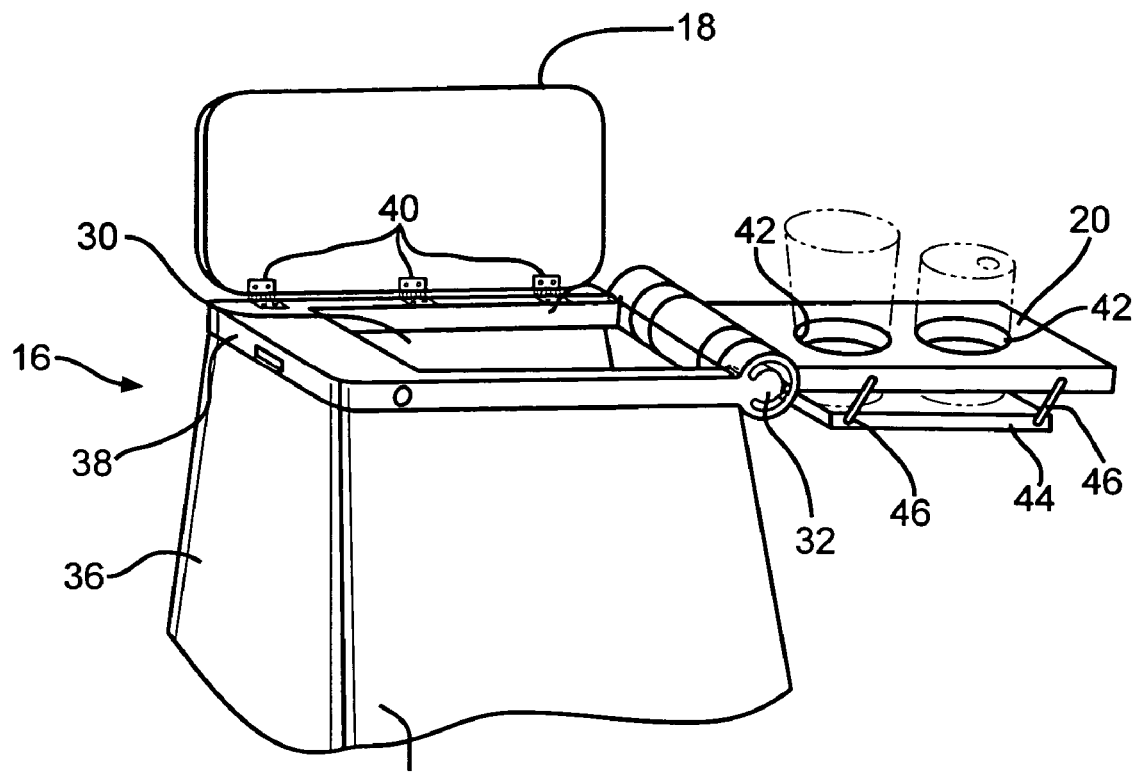
FIG. 5 is a perspective view of the console cover in the second open position and with the panel in an extended position according to the present invention.

The panel 20 is preferably formed as a part of the vehicle console 16 and can be used to receive any object that is desired to be restrained within the passenger compartment of the vehicle. For example, the object may be a beverage container, as shown in FIG. 5, and described below. It is anticipated that the beverage container will have a generally cylindrical shape (e.g. soda can) or a generally tapered cylindrical shape (e.g. fountain drink or coffee container). However, the object may be any removable item such as a mobile phone, PDA, sunglasses, cigarette box, or portable media, and have thus the panel 20 can any shape suitable to accommodate such objects. Also, a larger object holder assembly can also be implemented in accordance with this invention such that a notebook computer or other larger object can be supported therewith.

Although the object holder assembly 22 of the present invention is shown as being positioned in a center floor console of a vehicle, it should be understood that the panel 20 can be located in any suitable vehicle trim body, for example, a door panel (shown schematically at 24), an instrument panel 10 (shown schematically at 26), a glove box, another floor console, a quarter panel trim, or in an overhead console. The panel 20 could also be positioned horizontally, vertically, or at any suitable angle. Additionally, a separate panel or the same panel 20 could be configured for direct access by passengers in the front seats 12, 14.

Figure 2:
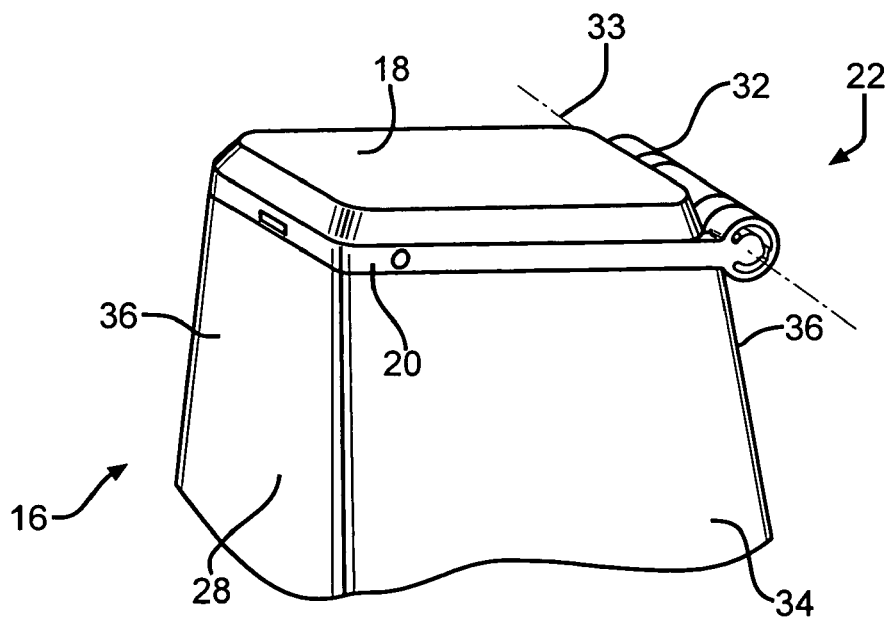
FIG. 2 is an enlarged perspective view of the console in a closed position.

Illustrated in FIGS. 2 through 8, there is shown the console 16 having the object holder assembly 22 according to the present invention. It can be appreciated that the object holder assembly 22 can be oriented in the vehicle to open towards the front of the vehicle or towards the rear of the vehicle, as shown in FIG. 1. As shown in FIG. 2, the console 16 is in a closed position. The console 16 defines a body 28 and an opening 30 (as can be more clearly shown in FIG. 3), wherein the opening 30 is configured to be covered by the object holder assembly 22 and the cover or lid 18. The body 28 is defined by a pair of opposed generally vertical side walls 34 that intersect at their respective ends with a pair of opposed generally vertical end walls 36. The side walls 34 are preferably adjacent the passenger seat 12 and passenger seat 14, respectively. The end walls 36 preferably face, respectively, the front end of the vehicle (towards the instrument panel 10) and the rearward end of the vehicle (away from the instrument panel). As shown in FIG. 2, the console is in the closed position. The lid 18 and object holder assembly 22 are positioned atop the console 16 therefore acting as a cover for the console 16. It is preferred that the object holder assembly 22 is pivotably connected to the console by a hinge mechanism 32. The structure of the hinge mechanism 32 will be described in greater detail below. The object holder assembly 22 can include a locking mechanism (not shown) that engages the console 16 to prevent the console 16 from being accidentally or inadvertently opened by someone or during operation of the vehicle. Devices for locking the lid 18 to the console 16 are generally known in the art, and therefore will not be described in greater detail than is necessary to understand the object of the invention described herein. Alternatively, or additionally, the lid 18 and the object holder assembly 22 can include tabs or other devices to assist a user in grasping the lid 18 and object holder assembly 22 to move those components according to the invention. Positioned atop the object holder assembly 22 is the lid 18. The lid 18 is preferably configured to cover the entire opening 30 of the console 16.

Figure 3:
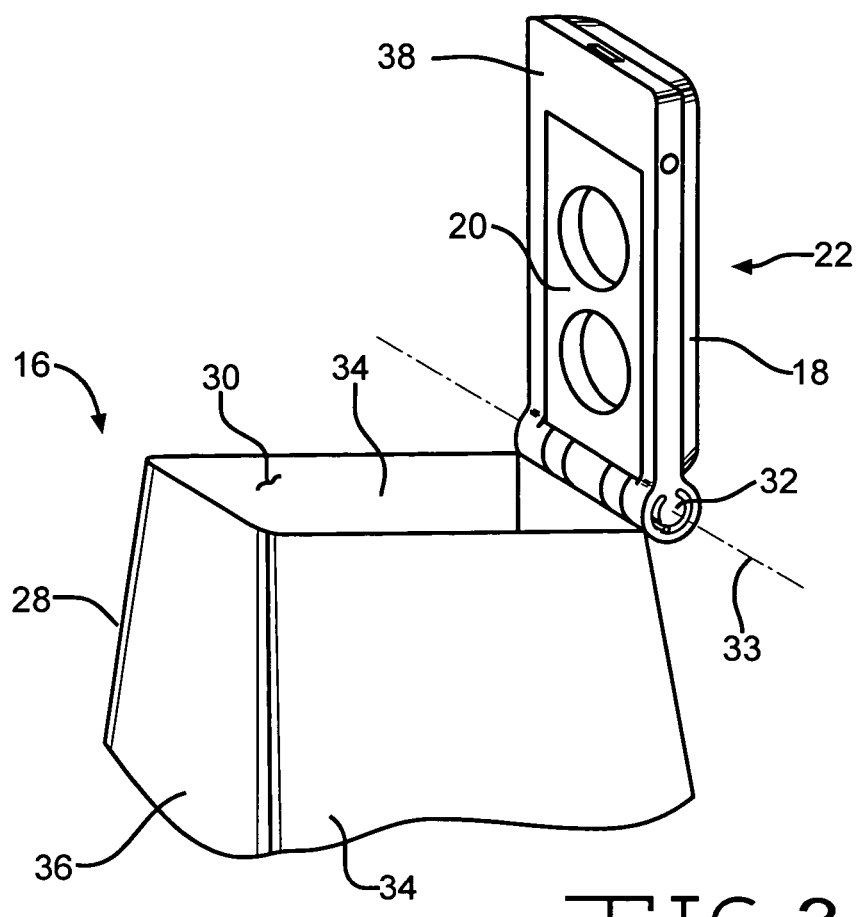
FIG. 3 is a perspective view of the console cover in a first open position.

To access the opening 30 of the console 16, and thereby gaining access to the interior of the body 28 for storage or any other use, the lid 18 and the object holder assembly 22 are pivoted together into the first open position as is shown in FIG. 3. In the first open position, the opening 30 is uncovered and substantially unobstructed so that a user can place items into the console 16. Both the lid 18 and the object holder assembly 22 are pivoted away from the opening about the hinge mechanism 32. The amount the lid 18 and object holder assembly 22 can be pivoted can be controlled by the design of the hinge mechanism so that the lid 18 and object holder assembly 18 can be pivoted from about 0 degrees (closed position) to over 180 degrees (first open position). As shown in FIG. 3, the entire object holder assembly 22 pivots about the hinge mechanism 32 when opened into the first open position. Therefore, the object holder assembly 22, which includes at least the panel 20, moves away from the opening 30 with the lid 18. The hinge mechanism 32, as shown in FIGS. 1 through 7, is positioned on the rearward end wall 36 of the console 16. It should be appreciated that the hinge mechanism can be positioned on the front end wall 36 of the console 16 as well, and that in such an embodiment, the object holder assembly 22 would pivot (about horizontal axis 33) towards the front of the vehicle.

Figure 4:
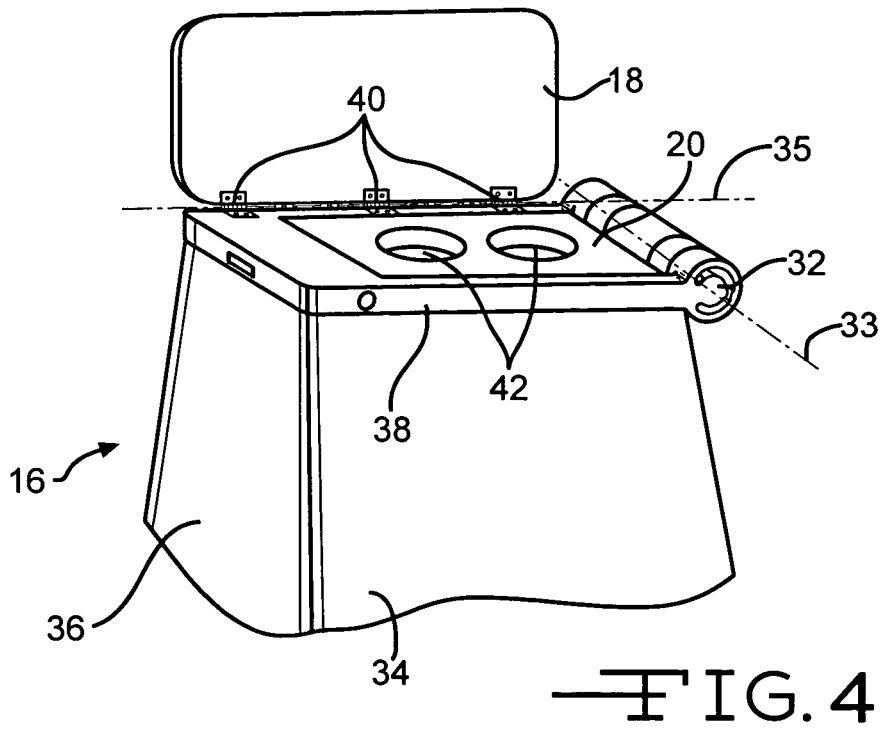
FIG. 4 is a perspective view of the console cover in a second open position allowing access to a cup holder panel.

Illustrated in FIG. 4, the console is opened into the second open position. In the second open position, the lid 18 is pivoted away from the opening 30 along a horizontal axis 35 that is generally perpendicular to the hinge mechanism 32 and axis 33. Thus, the lid 18 opens towards one of the side walls 34 of the console 16. The lid 18 can be configured to open towards the driver seat 12 or the passenger seat 14 depending on the desired console 16 accessibility. The lid 18 can also have a locking mechanism, such as was described above with respect to the object holder assembly 22 and the console 16, to retain the lid 18 with the object holder assembly 22. As can be best seen in FIG. 4, the object holder assembly 22 is positioned in between the lid 18 and the console 16, and is therefore within the opening 30 of the console 16. In the preferred embodiment, the lid 18 is pivotably attached to the object holder assembly 22 for pivoting movement relative thereto. It is further preferred that the lid 18 be pivotably mounted to the object holder assembly 22 by a second hinge mechanism 40. The second hinge mechanism 40 is aligned along a second axis 35 that is substantially perpendicular to the first hinge mechanism 32 and the first axis 33. The object holder assembly 22 can also be seen in greater detail in FIG. 4. The object holder assembly 22, in the preferred embodiment, includes an outer tray 38 and a panel 20 positioned within the tray 38 such that the tray 38 forms a frame for the panel 20 to be supported therewith. The panel 20 preferably further includes at least one receptacle 42, and preferably a plurality of receptacles 42 that are formed or attached to the panel 20 for supporting an object. The receptacle 42 can be any feature, such as a recess or a hole, for supporting an object placed therein. An example of a receptacle 42 is a slot that is formed through the panel 20. The slots 42 are preferably configured to receive and retain any object, and more preferably a beverage container therewith. Therefore, the slots 42 act as cup holders for passengers in the vehicle.

Illustrated in FIG. 5, the panel 20 is shown in an extended position. In the extended position, the panel 20 is moved outside of the opening 30 of the console 16 and is moved towards the rear of the vehicle. As stated above, the panel 20 can also be configured to pivot towards the front of the vehicle. Also, the lid 18, as shown in FIG. 5 is in the second open position thereby allowing access by a user to the panel 20. The panel 20 can be manually grasped by the user and pivoted approximately 180 degrees away from the tray 38 into a generally horizontal position so that it can be used as a beverage container holder. In that position, a user can access the interior of the console 16 through the opening of the tray 38.

Figure 6:
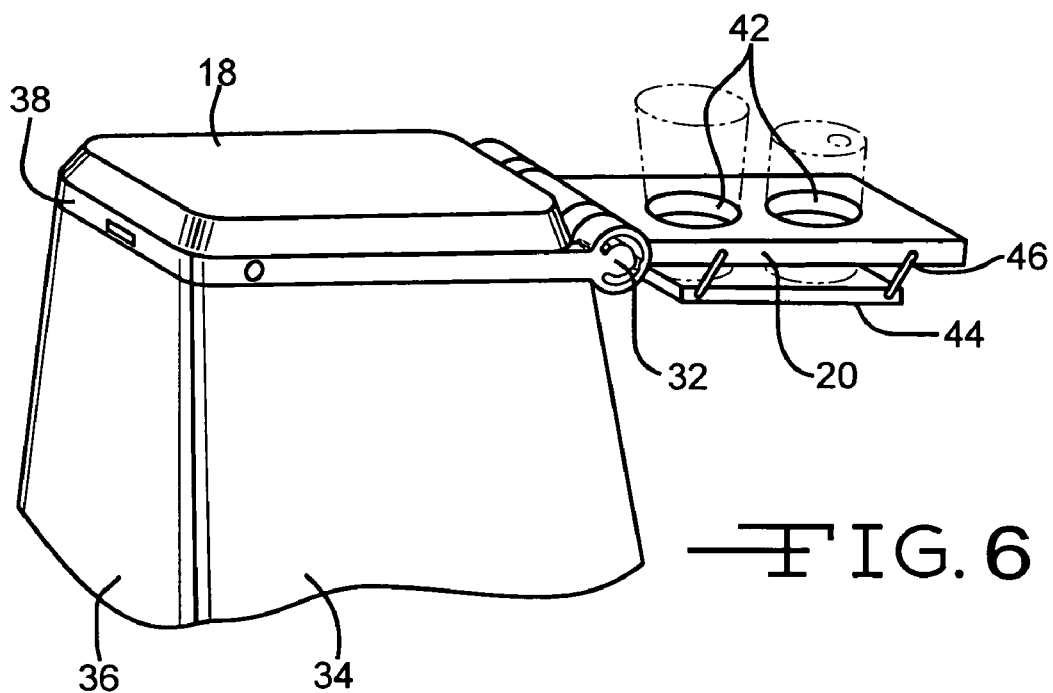
FIG. 6 is a perspective view of the console with the panel in the extended position and with the console cover in a closed position.
Figure 7:
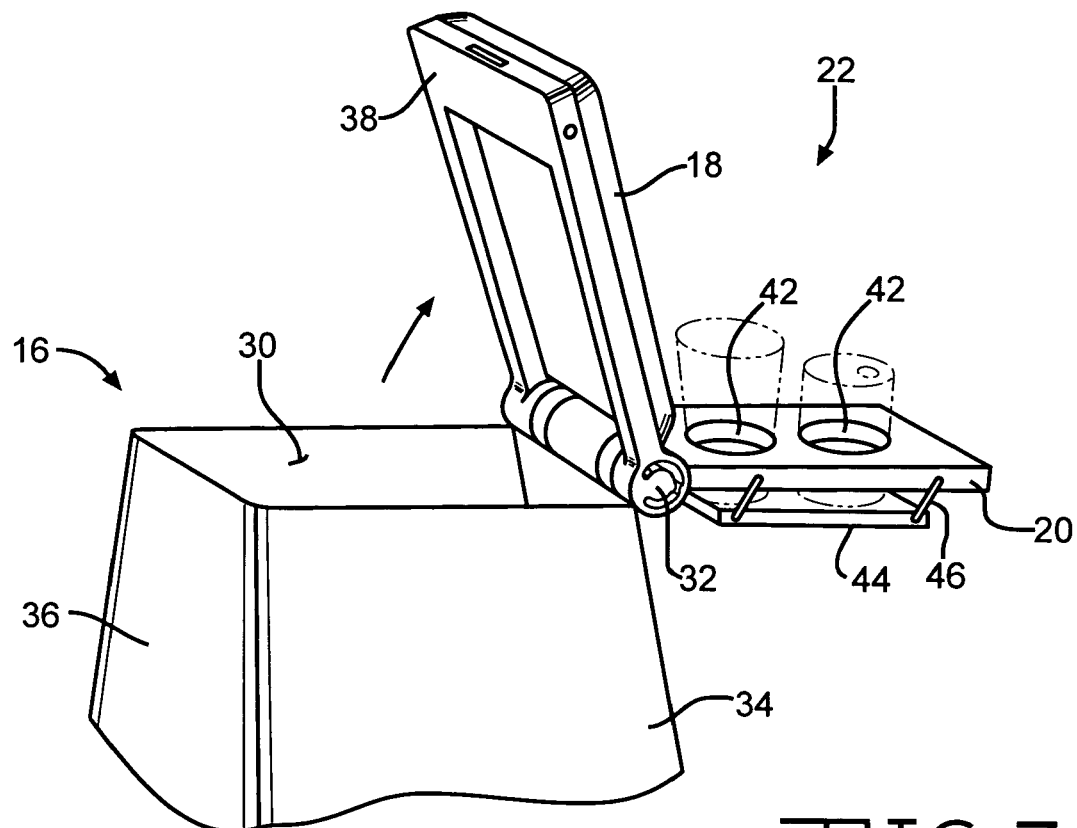
FIG. 7 is a perspective view of the console with the panel in the extended position and the console cover in the first open position according to the present invention.

Adjacent the panel 20, there optionally can be a support member 44 that is pivotably attached to the panel 20. The support member 44 is movable to an extended position, as shown in FIGS. 5 and 6 to provide a lower shelf or base to vertically support a object placed within the slots 42. Note that the optional support member 44 is shown in FIGS. 5 through 7 only for clarity. The support member 44 is connected to the panel 20 by pivotable arms 46. The arms 46 (shown only on one side of the panel 20), act to move the support member 44 when the panel 20 is moved. Thus, as the panel 20 is extended, the arms 46 rotate away from the panel 20 to allow the support member 44 to move away from the panel 20. As the panel 20 is moved into the retracted position, the arms 46 swing the support member 44 towards the panel 20 such that the support member 44 is positioned adjacent the panel 20 as the object holder assembly 22 is moved into the tray 38. Therefore, in the retracted position, wherein the panel 20 is upside down inside the tray 38, the support member 44 will be supported against the panel 20. However, the support member 44 (illustrated in FIGS. 5–7) is not shown in this position in FIG. 4 for the purposes of clarity.

It should be appreciated that the support member 44 can have any suitable configuration for supporting an object with the panel 20. For example, an arm can extend above the panel (in the extended position) to provide lateral support for the object, a thin rod or bar can extend below the panel 20 in the extended position (similar to the support member 44) to provide vertical support for an object positioned within the slot. The support member can also be formed as a detent defining a base and sides that are configured to provide at least partial lateral and vertical support of an object positioned therein.

Illustrated in FIG. 6, once the panel 20 is moved into the extended position, the lid 18 can also be returned to the closed position to cover the opening 30 of the console 16. In such a position, the lid 18 can be used as an armrest. Illustrated in FIG. 7, the object holder assembly 22 is in the extended position as was seen in FIGS. 5 and 6. While the panel 20 is extended, a passenger in the vehicle might wish to gain access to the opening 30 of the console 16 to utilize the storage compartment features of the console 16. Therefore, it is preferable that the lid 18 and tray 38 be pivotable while maintaining the extended position of the panel 20. This allows for the console 16 to remain fully functional while the panel 20 is extended and possibly supporting a beverage container therewith. To access the interior of the console 16 with the panel 20 extended, the lid 18 (which is attached to the tray 38) and tray 38 (which is attached by the hinge mechanism 32 to the console 16) are both pivoted about the hinge mechanism 32 to move the lid 18 and tray 38 away from the opening 30 into the first open position. Alternatively, the lid 18 can be moved into the second open position using hinge mechanism 40 thereby allowing a user to access the opening 30 through the tray 38 as can be seen in FIG. 5.

Figure 8:
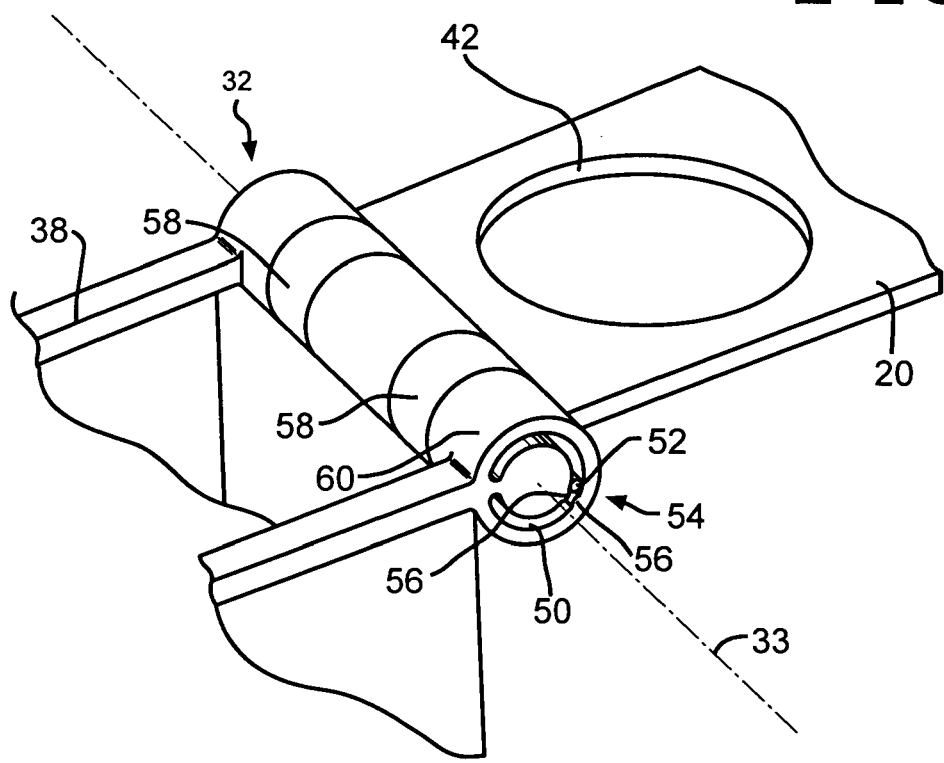
FIG. 8 is an enlarged perspective view of the console and more particularly the hinge mechanism that allows the console cover and panel to be pivoted according to the present invention.

Illustrated in FIG. 8 is an enlarged view of the hinge mechanism 32. It is preferred that the hinge design allow the panel 20 and the tray 38 to be independently pivotable relative to each other, while allowing them to both be pivoted simultaneously if so desired relative to the console 16. It is further preferred that the hinge mechanism 32 connecting the tray 38 and the panel 20 include a stop 54 so that the panel 20 is supported in a substantially horizontal orientation during normal loading (using the object holder as a cup holder and supporting a plurality of beverage containers on the panel 20). It is also preferred that the stop 54 be configured to allow the panel 20 to move beyond horizontal while in the extended position, particularly when a higher than normal load is applied to the panel 20. The relevance of this to the invention is that if an excessive force is applied to the panel 20 while it is in an extended position, the panel 20 can "break away" from the console without actually breaking the panel 20 and hinge mechanism 32, or without damaging the console 16, as was described above with respect to the design of the first hinge mechanism 32.

Therefore, according to the present invention, the embodiment of the hinge mechanism 32 includes a substantially semi-circular track 50 that is configured to receive a pin 52 of the panel 20. The pin 52 rotates with the panel 20 when rotated about the hinge mechanism 32. The pin 52 is sized to travel within the track 50, thereby allowing the pivoting movement of the panel 20 with the hinge mechanism 32. It is preferred that a stop, indicated generally at 54, is formed on the track 50. The stop 54 is designed to prevent movement of the pin 52 beyond the stop 54. As shown, the stop 54 is formed as pair of opposed protrusions 56 that reduce the width of the track 20, thereby preventing the pin 52 from travelling beyond the protrusions 56 under normal loading conditions. The space radial between the protrusions is preferably slightly less than the width or diameter of the pin 52. The stop 54 will therefore also help maintain the panel 20 in a substantially horizontal position while the panel 20 is in the extended position. As described above, when a larger force is applied to the panel 20, the pin 52 can be pushed past the stop 54 to prevent the panel 20 from breaking, or from breaking the hinge mechanism 32 and the console 16. The pin 52, the protrusions 56, and the hinge mechanism 32 may be made from a resilient material such that the either the pin 52 or the region surrounding the protrusions 56 can resiliently deform to allow the pin 52 to move past the stop 54. It is preferred that pins 52 be formed on both sides of the panel 20 such that the panel 20 is supported equally across its width. Therefore, it is also preferred that a pair of tracks 50 are formed at both ends of the hinge mechanism 32 to support the pins 52 of the panel 20.

It should be appreciated that the hinge mechanism 32 having a "break-away" design can have any suitable configuration such that a stop 54 is formed thereon to hold the panel 20 in a substantially horizontal position when extended. The stop can also have any suitable design such that the panel 20 can be moved beyond the stop without causing permanent damage to the panel 20, the console 16 and the hinge mechanism 32.

It is also preferred that the hinge mechanism 32 be at least partially mounted on the console 16 so that the tray 38 and the panel 20 can pivot relative to the console 16. The pivoting motion of the panel 20 was described above. The tray 38 therefore includes a clasp portion 58 that engages the body 60 of the hinge mechanism 32 such that the body 60 of the hinge mechanism 32 remains substantially stationary while the tray 38 and the clasp portion 58 rotates about the body 60. The clasp portion 58 of the tray 38 and the hinge mechanism 32 can also include features that delimit the angle about the axis 33 that the tray 38 can rotate (while in the first open position). Such a mechanism can include a stop mechanism such as was described above with respect to the panel 20 or can include any other features to control this movement.

Although the panel 20 has been shown and described as being substantially planar, it can be appreciated that the panel 20 can have any suitable shape (such as having an angled portion) so that the panel 20 is partly recessed within the cavity 30 when the panel 20 is in the retracted position. Using such a design, a support member 44 can be collapsed above the panel 20 in the retracted position while maintaining the proper clearance so that the lid 18 can be positioned over the cavity 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A console for a vehicle comprising:
   a body defining an opening therein;
   a tray movably mounted on the body;
   a lid configured to cover the opening, the lid being movably mounted on the tray; and
   a panel movably mounted on the tray, the panel being movable between a retracted position within the opening, and an extended position away from the opening;
   wherein the panel has at least one receptacle formed therein, the receptacle being configured for receiving an object therein.

2. The console defined in claim 1 wherein the receptacle is a slot formed through the panel.

3. The console defined in claim 1, wherein the panel is connected to the tray via a first hinge mechanism, and wherein the body includes a pair of opposed end first and second walls and a pair of opposed side walls, the first hinge mechanism being positioned at the first end wall of the body such that the panel hinges away from the second end wall of the body in the extended position and the panel hinges towards the second end wall of the body to at least partially cover the opening in the retracted position.

4. The console defined in claim 1 wherein the tray is connected to the body by a first hinge mechanism such that the tray, lid and panel are pivotable between a first open position and a closed position.

5. The console defined in claim 4 wherein the lid is connected to the tray by a second hinge mechanism such that the lid is pivotable relative to the tray between a second open position and a second closed position; and
   wherein the panel is movable into one of the retracted position and extended position when the lid is in the second open position.

6. The console defined in claim 5 wherein the lid is an arm rest when the lid is in the closed position.

7. The console defined in claim 6 wherein the lid is movable between the first open position, the second open position, and the closed position regardless of the position of the panel.

8. The console defined in claim 1 further comprising a support member for supporting an object with the receptacle.

9. The console defined in claim 1 wherein the opening of the body is configured to be used as a storage compartment.

10. The console defined in claim 1
    wherein the tray defines a frame for receiving the panel therein.

11. The console defined in claim 10 wherein the panel is connected to the tray via a first hinge mechanism, the first hinge mechanism allowing the panel and the tray to be pivoted between the retracted position within the opening, and an extended position away from the opening; and
    wherein the lid is connected to the tray via a second hinge mechanism, the second hinge mechanism allowing the lid to be pivoted between a closed position covering the tray, and a second open position away from the tray.

12. The console defined in claim 11 wherein the body includes a pair of opposed side walls and a pair of opposed end walls, the first hinge mechanism being positioned along one of the end walls of the console, and the second hinge mechanism being positioned on the tray adjacent one of the side walls of the body when the tray is in the retracted position.

13. The console defined in claim 1 further comprising a first hinge mechanism including a stop, the stop being configured to maintain the panel in a substantially horizontal position in the extended position and during normal loading, and the stop being configured to allow the panel to move beyond horizontal in the extended position and during higher than normal loading.

14. The console of claim 1, wherein the tray has an opening formed therein to provide access to the opening of the body.

15. A vehicle console member comprising:
    a body defining an opening therein;
    a tray pivotably mounted relative to the body by a first hinge mechanism, the tray defining a frame for receiving a panel therein;
    the panel having at least one receptacle formed therethrough, the panel being pivotably mounted relative to the body and the tray by the first hinge mechanism between a retracted position and an extended position;
    a lid pivotably mounted relative to the tray by a second hinge mechanism, the lid being configured to at least partially cover the opening;
    wherein the first hinge mechanism is positioned along an axis that is substantially perpendicular to an axis of the second hinge mechanism.

16. The vehicle console defined in claim 15 wherein the tray, the panel and the lid are jointly pivotable about the first hinge mechanism into a first open position.

17. The console defined in claim 15 wherein the panel is pivotable into the extended position when the lid is pivoted into a second open position.

18. The console defined in claim 15 wherein the lid is movable between a second open position and the closed position about the second hinge mechanism when the panel is in either the extended position or retracted position.

19. The console defined in claim 15 wherein the lid and tray are movable together between a first open position and the closed position about the first hinge mechanism when the panel is either in the extended position or retracted position.

20. A console for a vehicle comprising:
    a body defining an opening therein;
    a lid configured to cover the opening; and
    a panel movably mounted relative to the body, the panel being movable between a retracted position within the opening, and an extended position away from the opening;
    wherein the panel has at least one receptacle formed therein, the receptacle being configured for receiving an object therein, and wherein the lid and panel are connected to the body by a first hinge mechanism such that the lid and panel are pivotable between a first open position and a closed position, and wherein the lid is connected to the body by a second hinge mechanism such that the lid is pivotable between a second open position and a second closed position, and wherein the panel is movable into one of the retracted position and extended position when the lid is in the second open position.

21. A console for a vehicle comprising:
    a body defining an opening therein;
    a lid configured to cover the opening; and a panel movably mounted relative to the body, the panel being movable between a retracted position within the opening, and an extended position away from the opening; and a first hinge mechanism including a stop, the stop being configured to maintain the panel in a substantially horizontal position in the extended position and during normal loading, and the stop being configured to allow the panel to move beyond horizontal in the extended position and during higher than normal loading, wherein the panel has at least one receptacle formed therein, the receptacle being configured for receiving an object therein.

* * * * *